DAVID FERGUS.
Soda Water Draft Tubes.

No. 124,892. Patented March 26, 1872.

Witnesses.
John Taylor
Wm K Wright

Inventor.
David Fergus

UNITED STATES PATENT OFFICE.

DAVID FERGUS, OF PHILADELPHIA, PENNSYLVANIA.

IMPROVEMENT IN SODA-WATER DRAUGHT-TUBES.

Specification forming part of Letters Patent No. 124,892, dated March 26, 1872.

Specification describing an Improvement in Soda-Water Draught-Tubes, the invention of DAVID FERGUS, of the city of Philadelphia, in the State of Pennsylvania.

My invention relates to that part of the draught-tube which regulates the outflow of aerated water; and consists, first, of a peculiarly-formed perforated spindle. Second, of a combination of the spindle with apertures and a recess in the body of the tube, and a nozzle attached thereto, the whole being so constructed that, by a slight turn of the spindle, the aerated water is allowed to escape, either as a concentrated single jet for mixing the flavoring sirup, or in a divided or spray-like form.

Figure 1:
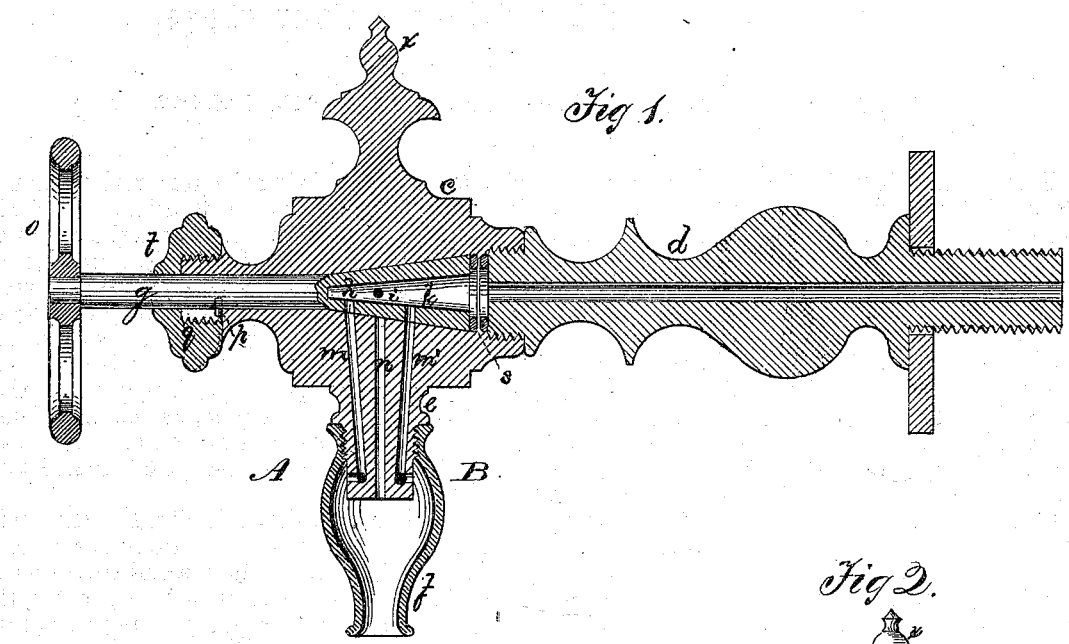
Figure 3:
Figure 2:
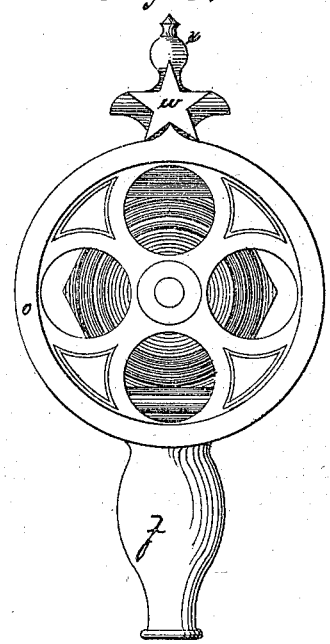

In the drawing, Figure 1 represents a longitudinal vertical section of the draught-tube, spindle $g$ being partly in elevation; Fig. 2, a front elevation of the same; Fig. 3, a transverse section on the line A B of Fig. 1.

$c$ is the body of the draught-tube; $d$, the neck by which it is attached to the fountain or to a pipe leading to the fountain; $e$, the stem of the draught-tube; $f$, the nozzle attached to the stem $e$. $g$ is the spindle, which is expanded into a cone or frustum shape, and made hollow at its inner end, and perforated at $h$, $i$, and $k$, as shown, the conical part of the spindle being ground to fit its seat in the draught-tube. $m$, $m^1$, and $n$ are perforations through the stem of the draught-tube. $o$ is a wheel fastened on the spindle $g$. $p$ is a pin or stop attached to the spindle $g$. $q$ is a recess, partially shown, formed in the body of the tube. It presents two shoulders, which, with the stop $p$, limit the travel of the spindle $g$ to about a half circle, or enough to bring the perforations $h$ and $k$ into line with the the perforations $m$ and $m^1$ or the perforation $i$ into line with the perforation $n$, as required. A small spiral spring, not shown, is inserted at $s$ between the neck $d$ and spindle $g$ to keep the spindle in its place when the pressure of the aerated water is shut off. $t$ is a cap to cover the recess $q$. $w$ is a star or sight-mark, which is brought into line with the knob $x$ on the draught-tube, as shown in Fig. 3, when the spindle $g$ is turned into the position required to stop the escape of aerated water.

The spindle $g$ is shown in Fig. 1 in the position it holds when the perforations $h$ and $k$ are in line with the perforations $m$ and $m^1$, respectively, the stop $p$ being then in contact with one shoulder of recess $q$, the water escaping through the perforations $m$ and $m^1$ and apertures $m^2$. If the spindle is then turned until the stop $p$ strikes the opposite shoulder of the recess $q$, the perforations $i$ and $n$ are brought into line and the aerated water escapes through the central aperture $n^2$.

I claim—

The combination of the spindle $g$, the inner end of which is in the form of a hollow perforated cone or frustum, stop $p$, recess $q$, wheel $o$, body $e$ of the draught-tube, perforations $m$ and $m^1$, and nozzle $f$, all constructed and operating in the manner and for the purpose substantially as set forth.

DAVID FERGUS.

Witnesses:
JOHN TAYLOR,
WM. R. WRIGHT.